(12) United States Patent
Offenmüller

(10) Patent No.: US 8,121,716 B2
(45) Date of Patent: Feb. 21, 2012

(54) SYSTEM AND METHOD FOR MANAGING SOFTWARE APPLICATIONS, PARTICULARLY MANUFACTURING EXECUTION SYSTEM (MES) APPLICATIONS

(75) Inventor: Werner Offenmüller, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1744 days.

(21) Appl. No.: 10/402,830

(22) Filed: Mar. 28, 2003

(65) Prior Publication Data

US 2003/0172371 A1     Sep. 11, 2003

Related U.S. Application Data

(63) Continuation of application No. PCT/DE01/03994, filed on Oct. 19, 2001.

(30) Foreign Application Priority Data

Oct. 20, 2000 (DE) .................. 100 52 369
Aug. 3, 2001 (DE) .................. 101 38 232

(51) Int. Cl.
*G06F 19/00* (2011.01)
(52) U.S. Cl. ............ 700/97; 700/95; 700/108; 717/120
(58) Field of Classification Search .................. 700/65, 700/95, 97, 108; 717/120
See application file for complete search history.

(56) References Cited

U.S. PATENT DOCUMENTS

| | | | |
|---|---|---|---|
| 5,890,130 A | 3/1999 | Cox et al. ............... | 705/7 |
| 5,918,226 A | 6/1999 | Tarumi et al. ............ | 707/10 |
| 6,038,541 A | 3/2000 | Tokuda et al. ............ | 705/8 |
| 6,078,325 A | 6/2000 | Jolissaint et al. ......... | 345/349 |
| 6,378,001 B1 * | 4/2002 | Aditham et al. ........... | 719/313 |
| 6,556,950 B1 * | 4/2003 | Schwenke et al. ......... | 702/183 |
| 6,708,074 B1 * | 3/2004 | Chi et al. .................. | 700/121 |
| 6,985,779 B2 * | 1/2006 | Hsiung et al. ............. | 700/19 |
| 7,069,101 B1 * | 6/2006 | Arackaparambil et al. .. | 700/121 |

FOREIGN PATENT DOCUMENTS

DE     199 00 884 A1     7/2000
EP     0 843 271 A2     5/1998

OTHER PUBLICATIONS

"Transparenz über die Abläufe schaffen"; elektrotechnik für die Automatisierung, Nov. 17, 1999.
"Daten sind für alle da"; Carl Hanser Verlag, München, 1997.
"Internet-based workflows: A Paradigm for Dynamically Reconfigurable Desktop Environments"; Hemang Lavana, Amit Khetawat, Franc Brglez; Department of Computer Science, NC State University, Raleigh, NC, 1997.
"Executable workflows: A Paradigm for Collaborative Design on the Internet"; Hemang Lavana, Amit Khetawat, Franc Brglez, Krzysztof Kozminski; Department of Computer Science, NC State University, Raleigh, NC, 1997.

* cited by examiner

*Primary Examiner* — Michael D Masinick
(74) *Attorney, Agent, or Firm* — King & Spalding L.L.P.

(57) ABSTRACT

Software applications (A1-A6), especially MES (Manufacturing Execution Systems) applications often exist in a heterogeneous form. The inventive system and method enable a user at a work station (AV1-AV3, PIW1, PIW2) to manage and monitor a number of different applications. Applications from the ERP (Enterprise Resource Planning) level and from the automation level can also be integrated. In addition, a user can define and monitor workflows (operations for carrying out, e.g. production orders).

28 Claims, 4 Drawing Sheets

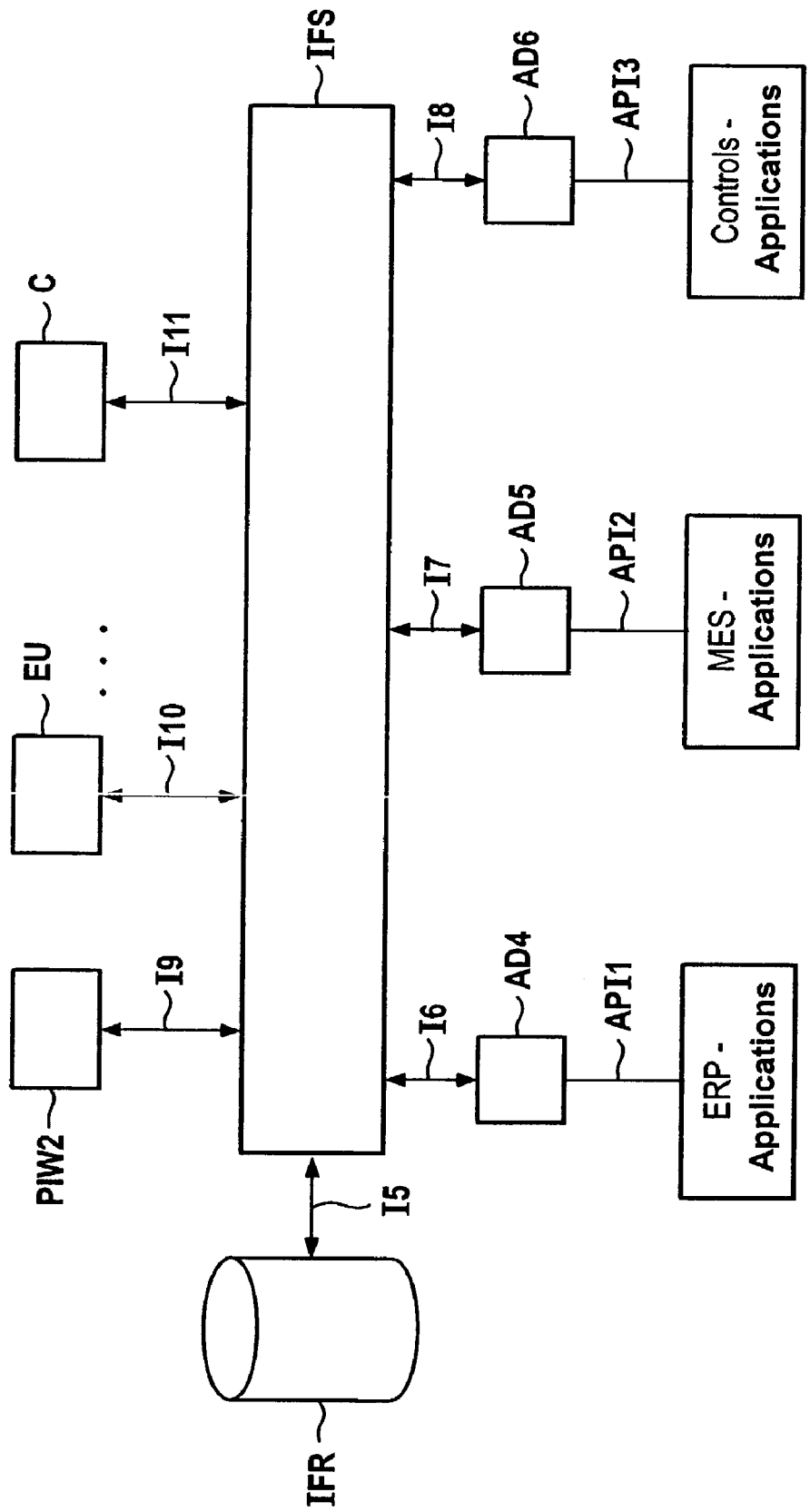

SYSTEM AND METHOD FOR MANAGING SOFTWARE APPLICATIONS, PARTICULARLY MANUFACTURING EXECUTION SYSTEM (MES) APPLICATIONS

CROSS REFERENCE TO RELATED APPLICATION

This application is a continuation of copending International Application No. PCT/DE01/03994 filed Oct. 19, 2001, which designates the United States, and claims priority to German application number DE10052369.2 filed Oct.20, 2000 and German application number DE10138232.4 filed Aug. 3 2001.

BACKGROUND OF THE INVENTION

The invention relates to a system for managing software applications, particularly MES applications. The invention also relates to a method for navigation in industrial installations and/or in industrial processes using software applications, particularly MES applications.

"Software für die Automatisierung—Transparenz über die Abläufe schaffen" [Software for automation—providing transparency through the cycles], an article by Dirk Kozian in Elektronik für die Automatisierung 11, 11 17.1999, discloses the practice of using "Manufacturing Execution Systems" (MES) for automating production and manufacturing cycles. These systems integrate the automation level (controls) with the ERP (Enterprise Resource Planning) systems on the enterprise command level. Manufacturing execution systems are systems which provide information about optimizing production cycles, for example. First, the manufacturing execution systems have to complement the ERP systems' coarse planning data with installation-specific, up-to-date fine planning data and to forward these data as appropriate to the subordinate automation level, and secondly they have the task of receiving production-related information from the automation level, editing it and forwarding it to the enterprise command level. MES systems thus perform the task of vertical integration between the enterprise command level and the automation level. Typical individual tasks of MES systems are enterprise asset management, maintenance management, information management, scheduling, dispatching and trace & track. These tasks are respectively performed by MES components and MES applications.

The software and data heterogeneity of the MES applications means that the MES applications are very difficult to manage and a user can navigate through them only with difficulty on account of the inadequate continuity. Typically, each MES application is therefore managed by a separate workstation.

DE 199 00 884 A1 discloses a system and a method for operating and observing an automation system with process visualization and process control using virtual installation models as a replica of a real installation.

SUMMARY OF THE INVENTION

It is an object of the invention to provide a system and a method for integrating and managing software applications, particularly MES applications, for industrial installations and/or industrial processes, so that the MES applications are available to a user in a simple and standard manner. In this context, the inventor set out that through the use of a framework (framework program) the interoperability between heterogeneous software applications (e.g. MES applications) can be achieved using standardized interfaces such as OPC (OLE for Process Control), ActiveX, XML (eXtensible Markup Language) or SOAP (Simple Object Access Protocol).

The object can be achieved by a system for integrating and/or managing software applications, particularly MES applications,
  having at least one computer unit for storing the software applications,
  having at least one framework program coupling the software applications, and
  having a display apparatus for
    defining and/or displaying workflow information regarding prescribable software applications in a first screen area,
    displaying state information characterizing prescribable software applications in a second screen area, and at least one adapter for connecting the software applications to the framework program, with provision being made for communication and/or data interchange between the software applications using the framework program.

This allows, by way of example, the machine operator to control and monitor a plurality of (including different) MES applications from one workstation. Despite the great heterogeneity of MES applications which normally exists, one workstation is sufficient to allow a machine operator to be provided with a full picture of particular cycles or methods in the installation. This allows equipment (e.g. monitors) and space to be saved. The workstation and the MES applications can be connected by means of the Internet, an intranet or other suitable media (e.g. LAN, WAN). In addition, a user can define a personalized view of the cycles in the installation. Besides MES applications, applications from the ERP level (Enterprise Resource Planning or enterprise command level) or from the controls level (automation level) can be integrated. Applications can also be integrated very advantageously if they support the component technology (e.g. ActiveX, Java etc.) or have been created as components and/ or if standard communication mechanisms (e.g. MSMQ, Microsoft Message Queue) are used.

In a first advantageous refinement of the present invention, the workflow information in the first screen area is defined by the user and represents an individual work cycle in the interaction of the software applications. A workflow is understood to mean a succession of actions. If, by way of example, a production site receives an order an order (e.g. manufacturing order) from a superordinate system, then this order needs to be implemented and distributed over the appropriate production units. In the workflow, it is now determined what needs to be performed in what sequence so as to meet the order. The user can now easily use text and/or a graphical editor to define or model workflows which represent the interaction of the software applications (e.g. MES applications). A workflow can be presented in a notation similar to explorer, for example.

In another advantageous refinement of the present invention, the workflow information shown in the first screen area is intended to be used for accessing data and/or methods associated with the software applications. This allows a user to use a simple user interface to access data and/or methods and/or objects associated with the applications (e.g. MES applications, material master data, timetables) and to relate them to other applications very easily.

In another advantageous refinement of the present invention, the first and second screen areas can be subdivided to show further information characterizing the software applications. This means that a monitor can be used to show further or more detailed information regarding the applications.

In another advantageous refinement of the present invention, the system is provided for operating and/or observing an industrial process and/or work cycles and/or an industrial automation system. This allows the system to be used not just for managing and observing MES applications, but also in general for industrial work cycles and automation systems.

In another advantageous refinement of the present invention, a popular web browser is used for display. This means that no additional component needs to be created for the user interface for the purpose of navigation and browsing in the applications. In addition, the users are familiar with the "look and feel" of the popular web browsers. This shortens the familiarization time. The option of "browsing" in the applications is an important aspect of integration.

In another advantageous refinement of the present invention, the display apparatus is in the form of a client of the framework program. This affords the advantages of a "client-server architecture" (e.g. optimum utilization of operating means which are available on a limited basis).

In another advantageous refinement of the present invention, components and/or modules from the enterprise resource planning area and/or from the control area can be accommodated in the screen areas. This allows not just applications from the MES level but also applications from the ERP level and the automation level (controls) to be managed and monitored in a system.

In another advantageous refinement of the present invention, the display apparatus is split into further screen areas. This increases the usability and flexibility of the system for a user.

In another advantageous refinement of the present invention, the system is used as a development environment for functions and applications which are available directly in the system. This allows new functions and applications to be created very quickly and on the basis of need without a separate development environment.

The object can also be achieved by a method for integrating and managing software applications, particularly MES applications, in industrial installations and/or in industrial processes, in which the software applications are stored on at least one computer unit, in which the software applications can be coupled to one another by means of at least one framework program, in which workflow information regarding prescribable software applications is defined and/or displayed in a first screen area on a display apparatus, in which state information characterizing prescribable software applications is displayed in a second screen area, and in which the software applications are connected to the framework program using adapters, with communication and/or data interchange between the software applications being effected using the framework program.

This allows, by way of example, the machine operator to control and monitor a plurality of (including different) MES applications from one workstation. Despite the great heterogeneity of MES applications which normally exists, one workstation is sufficient to allow a machine operator to be provided with a full picture of particular cycles or methods in the installation. This allows equipment (e.g. monitors) and space to be saved. The workstation and the MES applications can be connected by means of the Internet, an intranet or other suitable media (e.g. LAN, WAN). In addition, a user can define a personalized view of the cycles in the installation. Besides MES applications, applications from the ERP level (Enterprise Resource Planning or enterprise command level) or from the controls level (automation level) can also be integrated. Applications can be integrated very advantageously if they support the component technology (e.g. ActiveX, Java etc.) or have been created as components and/or if standard communication mechanisms (e.g. MSMQ, Microsoft MESsage Queue) are used. Navigation and "browsing" are important aspects when integrating heterogeneous applications from different automation levels.

In another advantageous refinement of the present invention, the workflow information in the first screen area is defined by the user and represents an individual work cycle in the interaction of the software applications. A workflow is understood to mean a succession of actions. If, by way of example, a production site receives an order an order (e.g. manufacturing order) from a superordinate system, then this order needs to be implemented and distributed over the appropriate production units. In the workflow, it is now determined what needs to be performed in what sequence so as to meet the order. The user can now easily use text and/or a graphical editor to define or model workflows which represent the interaction of the software applications (e.g. MES applications). A workflow can be presented in a notation similar to explorer, for example.

In another advantageous refinement of the present invention, the workflow information shown in the first screen area makes it possible to access data and/or methods associated with the software applications. This allows a user to use a simple user interface to access data and/or methods and/or objects associated with the applications (e.g. MES applications) and to relate them to other applications very easily.

In another advantageous refinement of the present invention, the first and second screen areas are subdivided to show further information characterizing the software applications. This means that a monitor can be used to show further or more detailed information regarding the applications.

In another advantageous refinement of the present invention, the method is used for operating and/or observing an industrial process and/or work cycles and/or an industrial automation system. This allows the inventive method to be used not just for managing and observing MES applications but also in general for industrial work cycles and automation systems.

In another advantageous refinement of the present invention, a popular web browser is used for display. This means that no additional component needs to be created for the user interface for the purpose of navigation and browsing in the applications. In addition, the users are familiar with the "look and feel" of the popular web browsers. This shortens the familiarization time. The option of "browsing" in the applications is an important aspect of integration.

In another advantageous refinement of the present invention, the display apparatus is in the form of a client of the framework program. This affords the advantages of a "client-server architecture" (e.g. optimum utilization of operating means which are available on a limited basis).

In another advantageous refinement of the present invention, components and/or modules from the enterprise resource planning area and/or from the control area are accommodated in the screen areas. This allows not just applications from the MES level but also applications from the ERP level and the automation level (controls) to be managed and monitored.

In another advantageous refinement of the present invention, the display apparatus is split into further screen areas. This increases the usability and flexibility of the system for a user.

In another advantageous refinement of the present invention, the method is used for developing functions and applications which are available directly. This allows new functions and applications to be created very quickly and on the basis of need without a separate development environment.

In another advantageous refinement of the present invention, the inventive method is implemented by a computer program. This allows any modifications and adjustments to be made easily.

In another advantageous refinement of the present invention, the computer program for the inventive method is stored on a data storage medium. This means that the method is easy to use in terms of logistics and distribution.

In another advantageous refinement of the present invention, the computer program for the inventive method is installed on a data processing device. This increases performance.

An exemplary embodiment of the invention which also reveals further advantages is illustrated in the drawing and is explained below.

BRIEF DESCRIPTION OF THE DRAWINGS

In the drawings:

FIG. 6 shows an overview of the central position of the framework program coupling the software applications.

DETAILED DESCRIPTION OF THE PREFERRED EMBODIMENTS

Figure 1:
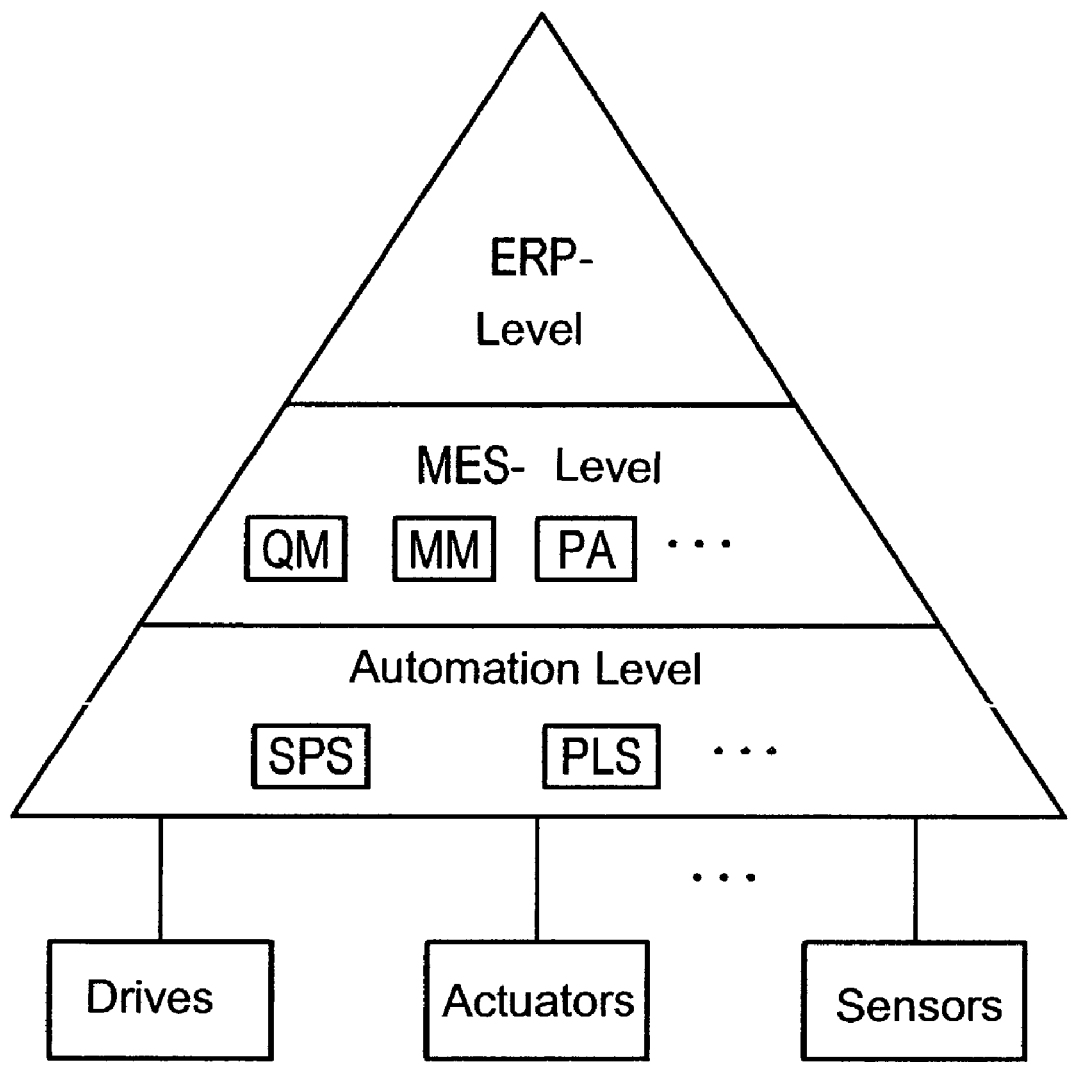
FIG. 1 shows an overview of the "enterprise pyramid" with three control levels.

The illustration shown in FIG. 1 shows an overview of the three control levels, as can normally be found in a production or manufacturing enterprise. The pyramid shape expresses that the information is compressed toward the top. The top level is the ERP (Enterprise Resource Planning) level. This enterprise command level is where the business management and sales tasks are normally performed in an enterprise (e.g. finance, sales, personnel, reporting). Logistical tasks across production installations (e.g. order and material management) are also performed on this level, however. The SAP R/3 system is an ERP system which is used very frequently on the enterprise command level.

The bottom level of the pyramid is the automation level (controls). This level normally sees the use of programmable logic controllers (PLCs) in conjunction with visualization and process control systems (PCSs). The drives, actuators and sensors in the production and/or manufacturing facilities are connected directly to the systems on this level.

The link between the ERP level and the automation level is formed by the MES level. The applications on the MES level thus ensure vertical integration between the ERP level and the automation level. The MES applications first have to complement the ERP systems' coarse planning with production-installation-specific fine planning and to forward this planning to the systems on the automation level, and secondly it is the task of the MES applications to receive production-related data from the automation level, to edit it and to forward it to the ERP level (enterprise command level).

Typical MES applications are, inter alia, quality management (QM), maintenance management (MM), performance analysis (PA), process management, labor management, asset management. In FIG. 1, three dots respectively express that a level can hold other elements (applications, systems, etc.).

Figure 2:
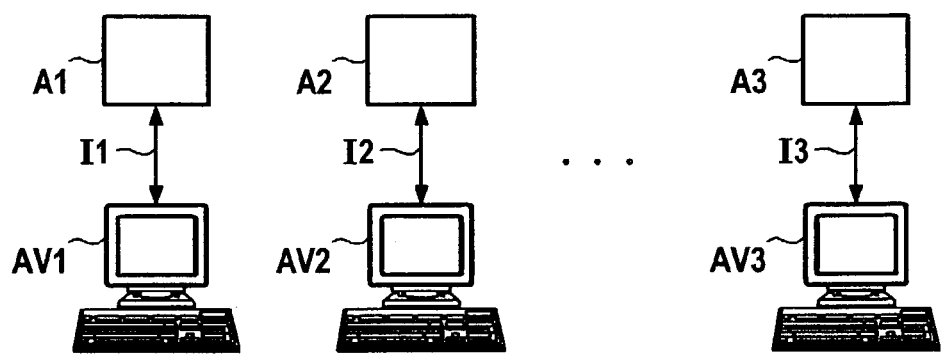
FIG. 2 shows the design of customary systems for managing MES applications.

The illustration in FIG. 2 shows the design of customary systems for managing MES applications. The illustration in FIG. 2 shows that each individual MES application A1-A3 is monitored or managed by precisely one respective workstation having a display apparatus AV1-AV3. In this context, the display apparatus AV1-AV3 used is normally a monitor or a display. The display apparatuses AV1-AV3 are normally integrated in a data processing installation having a processor, internal and external memories and having input apparatuses. The information paths I1-I3 connect the MES applications A1-A3 to the respective workstation (having a display apparatus and a processor and control elements). The bidirectional arrows I1-I3 indicate that information can be exchanged in both directions.

The drawback of the situation described above is that, for each MES application (e.g. maintenance management, information, management, scheduling, dispatching, etc.), a user needs a respective dedicated workstation for monitoring the respective MES application. This means that a user loses the complete overview and the full picture, and there is also no continuity in the individual MES applications.

Figure 3:
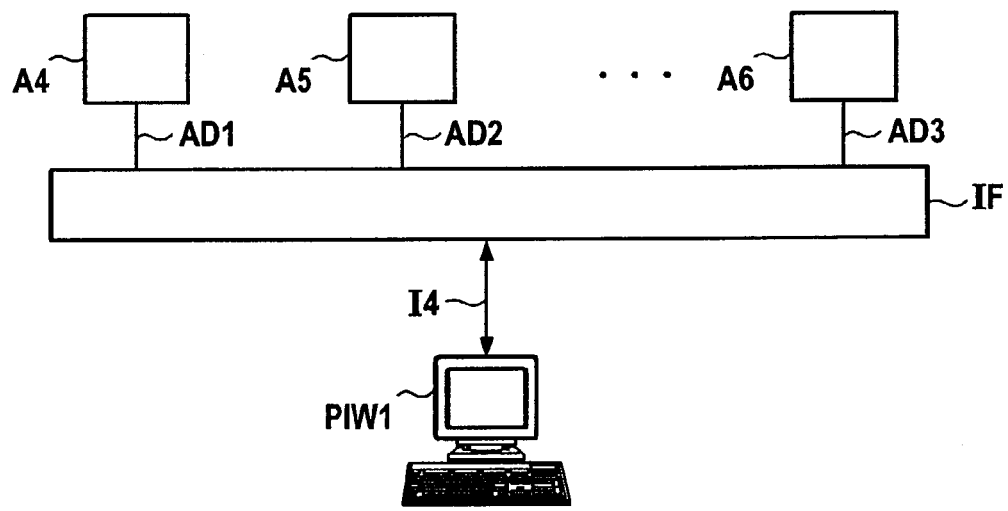
FIG. 3 shows the design of the inventive system for managing MES applications.

The illustration in FIG. 3 shows an overview of the design of the inventive system for managing MES applications or other applications. The individual MES applications A4-A6 are connected to a framework program (framework) IF by means of adapters AD1-AD3. The bidirectional information path I4 couples the user workstation PIW1 to the framework program IF, and the user workstation can thus manage and monitor the MES applications attached to or integrated on it. The user workstation PIW1 normally comprises a display apparatus (monitor, display etc.) for a data processing installation (e.g. PC) having a processor and memory devices and also input units (keyboard, mouse etc.). The MES applications A4-A6 and the framework program IF can run on dedicated data processing units or processors, but it is also possible for them to run on the data processing unit in the PIW1.

Adapters AD1-AD3 connect the respective MES applications A4-A6 to the framework program IF. The adapters are thus the coupling blocks between the framework program IF and the applications. The adapters can thus also be used to connect inherently heterogeneous applications to one another, and integration with the framework program IF allows communication and data interchange between the applications. Besides MES applications, it is also possible to integrate applications from the enterprise command level (enterprise resource planning level) and/or from the automation level (controls level) using the framework program IF, and to use the workstation PIW1 (the acronym PIW stands for "Personalized Industrial Workplace") to monitor and manage them. The framework program IF thus forms an integration platform for the entire industrial division. Different applications from the enterprise command level of the MES level and the automation level can easily and economically be integrated by the framework program IF using adapters. The framework program IF can thus be regarded as a middleware platform and as a manufacturing application integration tool. The workstation PIW1 allows a user (e.g. the installation operator) to see the respective states of the applications which are to be monitored, and he can also access data and methods associated with the applications and can additionally use this access to connect applications to one another.

The framework program IF thus firstly allows vertical integration of applications from different enterprise levels to be achieved, and secondly the framework program IF allows horizontal integration of applications on the MES level.

For a user at the front end of MES applications or other applications from the enterprise, the workstation PIW1 is "One Window to the World". This means that the workstation uses a common and standard interface to allow integrative access to different, even heterogeneous applications in the enterprise. In addition, a user of this workstation can generate and configure an interface tailored to his personal tasks which allows him to access all applications which he requires in order to be in control of his activities. The user of the workstation PIW1 can thus monitor and manage all integrated MES applications or other applications from this one workstation. This workstation can be connected to the applications over the Internet, the intranet, LAN (Local Area Network) or other conceivable connections. It is also possible for this workstation to be in the form of a mobile station, e.g. a mobile terminal (PDA, mobile phone). This mobility would provide a user with even more advantages.

Figure 4:
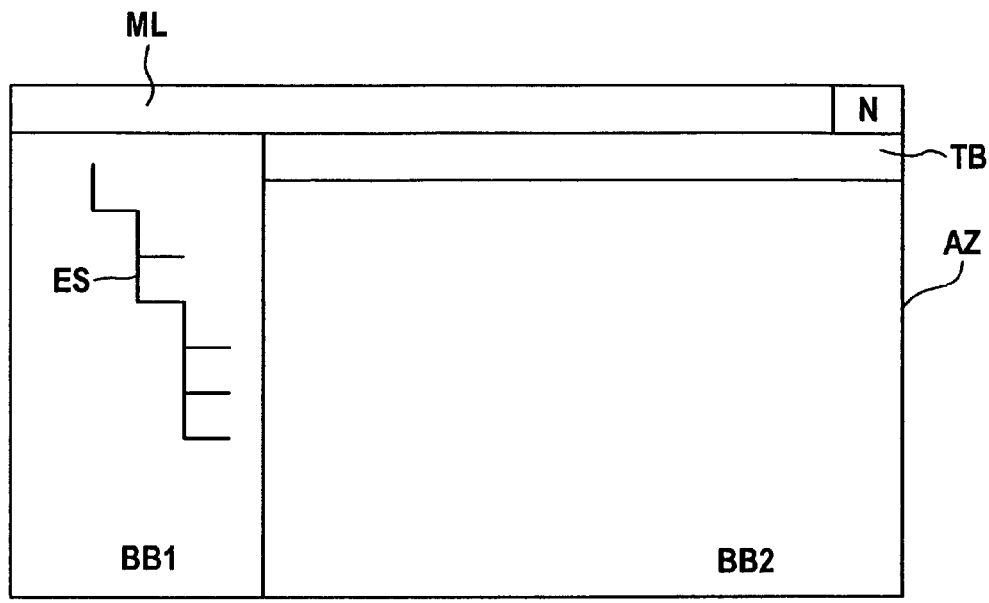
FIG. 4 shows an overview of the screen areas for the subject matter of the invention.

The illustration in FIG. 4 shows an overview of the screen areas for the subject matter of the invention. The display apparatus AZ used can be a screen, for example. FIG. 4 shows two main screen areas BB1 and BB2. The information shown in the screen areas BB1 and BB2 can be manipulated and influenced using inputs on the keyboard or using the menu bar ML or using the toolbar TB (e.g. with the mouse or a pointer). Examples of functions which are made available via the menu bar ML or via the toolbar TB, for example, are zoom, save, cut, copy, paste etc. FIG. 4 shows the menu bars ML and the toolbar TB at the top end of the figure, but a user can configure these bars himself and can position them at different points in the screen area. On the left-hand side of FIG. 4, a workflow defined by the user is shown in the screen area BB1 in an explorer-like structure ES. A workflow is understood to mean a succession of individual work steps for activities. Using the personalized industrial workplace (PIW1; FIG. 3), such workflows (a workflow is a succession of steps for handling an order, for example) can be defined very easily and flexibly using the available display and input tools (e.g. menu bars, toolbars, keyboards, mouse etc.). As indicated in screen area BB1, the workflows can be displayed in a hierarchic structure.

Besides the definition and configuration of workflows, the personalized industrial workplace (PIW1; FIG. 3) provides the following further control options or services:
  Personal access to the applications and services integrated in the framework program (IF; FIG. 3), e.g. a standard login.
  Personal access to the applications involved, i.e. integrated. This can involve access to data and to methods.
  Data interchange between the applications which is defined and initiated by the user.
  Starting and stopping different client applications, where the framework program (IF; FIG. 3) is in the form of a server.
  The development and integration of further applications or services which on the basis of the applications integrated in the framework program (IF; FIG. 3). In this case, the workstation (PIW1; FIG. 3) acts as a development environment which makes it possible to implement functions which, by way of example, have not been covered by any of the integrated applications to date. These newly produced functions, applications or services are treated as normal applications and are easy to integrate into the workstation (PIW1; FIG. 3). In addition, the development environment described uses the data provided by the integrated applications.

Furthermore, the display apparatus AZ provides screen areas, e.g. the area BB2, for observing and monitoring the individual applications integrated in the framework program (IF; FIG. 3). The screen area BB2 in FIG. 4 can show, by way of example, the behavior of an application in the form of a state diagram (state machine). Alternatively, other graphical or textual forms of description are conceivable.

The explorer-like structure ES shown in the left-hand screen area BB1 is a hierarchically structured tree which can also be used as a system navigator. The individual elements of the tree are entry options for the different programs or integrated applications. These entry points lead directly to masks within the respective application. The associated application then appears in the right-hand screen area BB2. The entry points in the tree are represented by graphical symbols (icons) which can be activated by double-clicking, for example. A user can define and change the labels in the tree structure as desired. A drag and drop function allows the hierarchy of the tree structure to be easily changed, or the workflow concealed by it.

The system navigator described performs different functions within the context of the workstation (PIW1; FIG. 3). The most important function of the system navigator is hierarchic representation of the installed modules, applications and functions in a project space. The individual modules and applications can be started using the system navigator. The system navigator is a separate window on the display apparatus AZ. FIG. 4 outlines the fact that the left-hand screen area BB1 can perform the function of the system navigator. If required, the system navigator can be turned off. Since the system navigator can be used to show all applications and functionalities, the system tree will probably appear cluttered. Using the toolbar TB or using the menu bar ML, the user can use function-oriented keys, such as production, planning, report and system, to display a previously defined, respectively dedicated tree structure. These function-related tree structures allow the user to work in a role-based, clear and flow-oriented manner.

In addition, the workstation (PIW1; FIG. 3) can be used to define a plurality of different user roles (e.g. installation operator, system integrator or quality manager etc.). On the basis of these user roles, the users have different access authorizations or display options available. In addition, a user can define an autostart configuration. This autostart configuration stipulates which applications are started directly when logging in and which applications are opened as entry windows with which entry point. In addition, the user can set the configuration obtaining when logging off always to be used as the autostart configuration.

The use of special graphics cards allows two or more monitors to be connected to a PC. These screens complement one another to produce a logical display unit and can be operated by the user, e.g. using a keyboard and a mouse. To facilitate internationalization, it is expedient for all texts on the interface and for the files to be stored in unicode format. To provide the workstation, it is expedient to design the interface as an OLE container, and this allows ActiveX controls and applications with OLE capability to be incorporated (OLE stands for Object Linking and Embedding).

Figure 5:
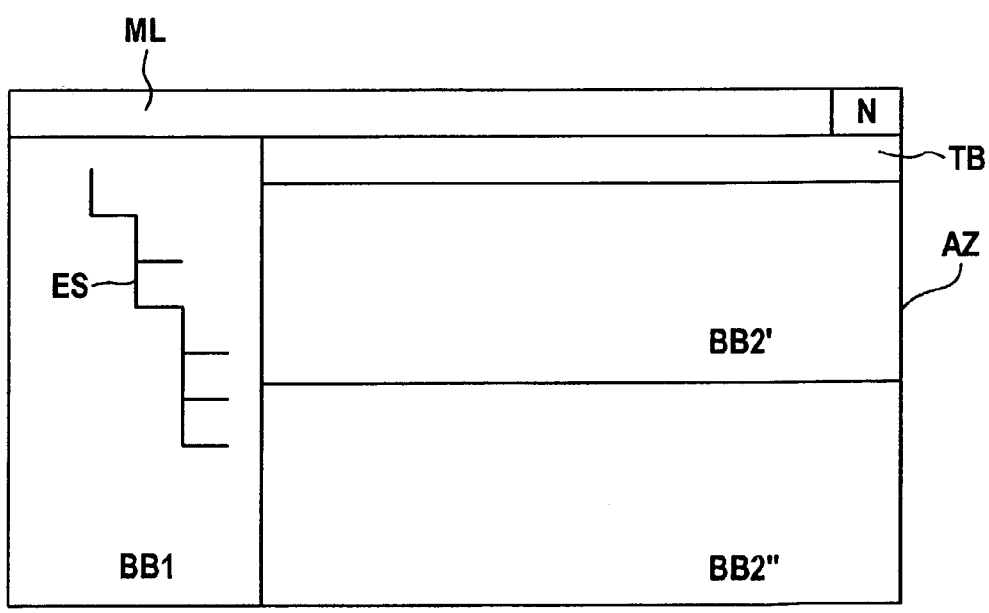
FIG. 5 shows a further illustration of the screen areas for the subject matter of the invention.

The illustration in FIG. 5 shows another illustration of the screen areas for the subject matter of the invention. FIG. 5 shows that the display apparatus AZ can be split into further screen areas, in principle as many as desired, in this case BB2', BB2''. Each screen area can be used to show an application, for example. For the applications, the displays in the screen areas are front ends within the context of "One Window to the World" for a user. The size of the screen areas can be varied very easily, for example by simply dragging with the mouse. The window size can be altered in the horizontal, vertical and diagonal directions. The screen areas BB1 and BB2' or BB2" can show not only information regarding the applications but also information from the framework program (IF; FIG. 3). FIG. 5 also shows a menu bar ML and a toolbar TB. These bars contain function buttons which can be activated by the user, e.g. by clicking on the mouse. The user can also store personally defined function buttons in the bars ML and TB.

On the left-hand side, the screen area BB1 shows an explorer-like structure ES like that outlined in FIG. 4. This hierarchic structure can be a workflow or else a navigation means for getting to applications or functions very quickly in the system.

A user can log in as a normal user, or else can log in as a subuser.

These different user levels differ in terms of the rights which a user is allowed: possible attributes can be as follows: observation, reading, writing, changing values, which are additionally restricted via the enterprise levels (e.g. enterprise, site, division, manufacturing cell, production unit, elements, functions).

The illustration in FIG. 6 shows an overview of the central position of the framework program coupling the software applications. To implement the inventive system or method, it is appropriate to choose a client-server architecture. In this case, the framework program (IF; FIG. 3) can be implemented on a single server or on a plurality of arbitrary servers which can be distributed in an IT landscape. FIG. 6 shows that the framework program (IF; FIG. 3) is located on a server IFS (Industrial Framework Server). Attached to this central server IFS are the clients connected by the bidirectional information paths I5-I11. The clients include, firstly, the applications from the ERP level, from the MES level and from the automation level. In FIG. 6, these applications are shown at the bottom edge of the picture. The adapters AD4-AD6 connect these applications to the framework program (IF; FIG. 3) and hence to the server IFS. The adapters AD4-AD6 are connected to the applications via API interfaces API1-API3 (API stands for Application Programming Interface). An Application Programming Interface is an interface which has a set of instructions. APIs are also used for converting parameter lists from one format to another and for interpreting the arguments in one or both directions. The APIs are, so to speak, the glue between the applications and the adapters. The adapters AD4-AD6 are connected to the framework program (IF; FIG. 3) (shown in FIG. 6 by the bidirectional information paths I6-I8) by means of suitable data formats (e.g. XML), suitable protocols (XOP, OPC etc.) and suitable transport mechanisms (e.g. DCOM or MSMQ). HTTP (Hyper Text Transfer Protocol) can also be used in this context. The protocol SOAP (Simple Object Access Protocol), which is based on XML (eXtensible Markup Language), can also be used for integrating the adapters AD4-AD6 into the framework program (IF; FIG. 3) or into the associated server IFS. Clients or applications which support ActiveX documents or ActiveX calls can be integrated particularly advantageously into the framework program (IF; FIG. 3) or into the server IFS. As a further client, the repository IFR (Industrial Framework Repository) can be connected to the server IFS. In FIG. 6, this connection is shown by the bidirectional information path I5. The repository IR is used to keep data secure and perpetual. Method calls can be used to access these data. The repository stores, inter alia, objects, methods and runtime data.

The top half of the picture shows further clients of the server IFS. The personalized industrial workplace PIW2 and any engineering environment EU which may exist are clients of the server IFS. The personalized industrial workplace PIW2 is connected to the framework program (IF; FIG. 3) or to the server by the bidirectional information path I9, and the engineering environment EU is accordingly connected to the bidirectional information path I10. The three dots show that further clients can be attached to the server IFS. FIG. 6 indicates that a further client C, connected by the information path I11, is also attached to the server IFS.

The clients IFR, PIW2, EU, C are connected as appropriate by means of APIs or by means of popular data formats (XML), popular protocols (XOP, OPC) and popular transport mechanisms (DCOM, HTTP, MSMQ etc.).

The adapters AD4-AD6 used allow access to data and also to methods associated with the individual applications which connect them to the framework program (IF; FIG. 3). These adapters are defined very flexibly and not for individual specific protocols or specific transport mechanisms. If the adapters are used in a runtime environment, then they are configured such that it is certain that particular required data from an application will be available at the correct time in the server environment. This can be done—as already said—using different protocols and transport mechanisms. A runtime environment can contain a plurality of adapters, which can also have small server properties (such as execution of workflows, provision of various communication options, . . . ). These adapters can run on the respective application computer. They do not have to run on just one machine, however, they can also be distributed.

Software applications, particularly MES (Manufacturing Execution Systems) applications, are often in a heterogeneous form. The inventive system and method allow a user to manage and monitor a plurality of different applications on one workstation. It is also possible to integrate applications from the ERP (Enterprise Resource Planning) level and from the automation level. In addition, a user can define and monitor workflows (cycles for carrying out manufacturing orders, for example).

The inventive system and method described above can be implemented as a computer program in languages which are known for the purpose. A computer program implemented in this manner can be stored and transported using electronic data routes, but also on data storage media, in a manner which is likewise known.

The invention claimed is:

1. A system for integrating and/or managing software applications, particularly MES applications, comprising:
  a plurality of computer units for storing the software applications, such that at least some of the software applications are stored at computer units which can be located physically remote from each other and which are connected by the Internet or other network,
  at least one framework program coupling the software applications,
  a display apparatus for:
    displaying in a first screen area a hierarchy of successive workflow steps that collectively define a workflow of different software applications in form of a tree structure, wherein each displayed workflow step defines a different entry point of a corresponding software application, including different software applications located physically remote from each other, such that individual displayed workflow elements act as user-selectable entry points for starting the corresponding individual software applications upon user selection of the individual displayed workflow elements, wherein display of the hierarchy of the successive software applications can be altered to show different function related tree structures depending on a user role, wherein the function is selected from the group consisting of: production, planning, report and system and wherein the user role further determines access authorizations and display option, and displaying state information of an individual software application that has been selected in the first screen area in a second screen area, a user interface allowing a user to graphically modify the workflow by rearranging one or more displayed relationships between one or more elements of different software applications physically remote from each other, and at least one adapter for connecting the software applications to the framework program, with provision being made for communication between the software applications using the framework program.

2. The system as claimed in claim 1, wherein the workflow information in the first screen area is defined by the user and represents an individual work cycle in the interaction of the software applications.

3. The system as claimed in claim 1, wherein the workflow information shown in the first screen area is intended to be used for accessing data associated with the software applications.

4. The system as claimed in claim 1, wherein the second screen area is subdivided to show further information of the another individual software application.

5. The system as claimed in claim 1, wherein the display apparatus is provided for personal configuration by a user of the system.

6. The system as claimed in claim 1, wherein the display apparatus is provided for a user to define different user roles.

7. The system as claimed in claim 1, wherein the system is provided for operating and/or observing an industrial process and/or work cycles and/or an industrial automation system.

8. The system as claimed in claim 1, wherein a web browser is used for display.

9. The system as claimed in claim 1, wherein the display apparatus is in the form of a client of the framework program.

10. The system as claimed in claim 1, wherein components and/or modules from the enterprise resource planning area and/or from the control area can be accommodated in the screen areas.

11. The system as claimed in claim 1, wherein the display apparatus is split into further screen areas.

12. The system as claimed in claim 1, wherein the system is used as a development environment for functions and applications which are available directly in the system.

13. A method for integrating and managing software applications, particularly MES applications, in industrial installations and/or in industrial processes, comprising:

storing the software applications on a plurality of computer units, such that at least some of the software applications are stored at computer units which can be located physically remote from each other and which are connected by the Internet or other network, coupling the software applications to one another by means of at least one framework program, displaying, in a first screen area on a display apparatus, a hierarchy of successive workflow steps that collectively define a workflow of different software applications in form of a tree structure, wherein each displayed workflow step defines a different entry point of a corresponding software application, including different software applications located physically remote from each other, such that individual displayed workflow elements act as user-selectable entry points for starting the corresponding individual software applications upon user selection of the individual displayed workflow elements, wherein display of the hierarchy of the successive software applications can be altered to show different function related tree structures depending on a user role, wherein the function is selected from the group consisting of: production, planning, report and system and wherein the user role further determines access authorizations and display option;

displaying in a second screen area state information of an individual software application that has been selected in the first screen area, receiving, via a user interface, user input for graphically modifying the workflow by rearranging one or more displayed relationships between one or more elements of different software applications stored physically remote from each other, connecting the software applications to the framework program using adapters, and using the framework program to facilitate communication and/or data interchange between the software applications.

14. The method as claimed in claim 13, wherein the workflow information in the first screen area is defined by the user and represents an individual work cycle in the interaction of the software applications.

15. The method as claimed in claim 13, wherein the workflow information shown in the first screen area allows access to data and/or methods associated with the software applications.

16. The method as claimed in claim 13, wherein the second screen area is subdivided to show further information of the another individual software application.

17. The method as claimed in claim 13, wherein a user of the system can configure the display apparatus personally.

18. The method as claimed in claim 13, wherein a user of the system can use the display apparatus to define different user roles.

19. The method as claimed in claim 13, wherein the method is used for operating and/or observing an industrial process and/or work cycles and/or an industrial automation system.

20. The method as claimed in claim 13, wherein a popular web browser is used for display.

21. The method as claimed in claim 13, wherein the display apparatus is in the form of a client of the framework program.

22. The method as claimed in claim 13, wherein components and/or modules from the enterprise resource planning area and/or from the control area are accommodated in the screen areas.

23. The method as claimed in claim 13, wherein the display apparatus is split into further screen areas.

24. The method as claimed in claim 13, wherein the method is used for developing functions and applications which are available directly.

25. A framework program for integrating and managing software applications, in industrial installations, the framework program embodied in tangible computer readable media and when executed operable to:

couple the software applications to one another such that at least some of the software applications are stored at computer units which can be located physically remote from each other and which are connected by the Internet or other network, couple the software applications to one another, display, in a first screen area on a display apparatus, a hierarchy of successive workflow steps that collectively define a workflow of different software applications in form of a tree structure, wherein each displayed workflow step defines a different entry point of a corresponding software application, including different software applications which can be located physically remote from each other, such that individual displayed workflow elements act as user-selectable entry points for starting the corresponding individual software applications upon user selection of the individual displayed workflow elements, wherein display of the hierarchy of the successive software applications can be altered to show different function related tree structures depending on a user role, wherein the function is selected from the group consisting of: production, planning, report and system and wherein the user role further determines access authorizations and display option:

display, in a second screen area, state information of an individual software application that has been selected in the first screen area, receive, via a user interface, user input for graphically modifying the workflow by rearranging one or more displayed relationships between one or more elements of different software applications stored physically remote from each other, connect to the software applications using adapters, and effect communication between the software applications.

26. A tangible data storage medium for storing a computer program for integrating and managing software applications, in industrial installations and/or in industrial processes the computer program when executed operable to:

couple the software applications to one another via the Internet or other network, display, in a first screen area on a display apparatus, a hierarchy of successive workflow steps that collectively define a workflow of different software applications in form of a tree structure, wherein each displayed workflow step defines a different entry point of a corresponding software application coupled to one another via the Internet or other network, such that individual displayed workflow elements act as user-selectable entry points for starting the corresponding individual software applications upon user selection of the individual displayed workflow elements, wherein display of the hierarchy of the successive software applications can be altered to show different function related tree structures depending on a user role, wherein the function is selected from the group consisting of: production, planning, report and system and wherein the user role further determines access authorizations and display option:

display, in a second screen area, state information of an individual software application that has been selected in the first screen area, receive, via a user interface, user input for graphically modifying the workflow by rearranging one or more displayed relationships between one or more elements of different software applications stored physically remote from each other, connect to the software applications using adapters, and effect communication between the software applications.

27. A data processing device comprising: at least one framework program for integrating and managing software applications, wherein:

the software applications include software applications stored at computer units which can be located physically remote from each other and which are connected by the Internet or other network the software applications can be coupled to one another by means of the at least one framework program, a hierarchy of successive software applications that collectively define the framework program is displayed in a first screen area on a display apparatus in form of a tree structure, wherein different displayed graphical representations of the hierarchy are linked to different corresponding software applications, including different software applications located physically remote from each other, such that the individual displayed graphical representations act as user-selectable entry points for starting the corresponding individual software applications upon user selection of the individual displayed graphical representations, wherein display of the hierarchy of the successive software applications can be altered to show different function related tree structures depending on a user role, wherein the function is selected from the group consisting of: production, planning, report and system and wherein the user role farther determines access authorizations and display option:

state information of an individual software application that has been selected in the first screen area is displayed in a second screen area, a user interface allows a user to graphically modify the hierarchy by rearranging one or more displayed relationships between one or more graphical representations of different software applications stored physically remote from each other, and the software applications are connected to the framework program using adapters, with communication between the software applications being effected using the framework program.

28. The system as claimed in claim 1, wherein the user interface allows a user to graphically drag and drop graphical representations of software applications in order to modify relationships between one or more graphical representations of different software applications.

* * * * *